US006531188B1

(12) United States Patent
Maag et al.

(10) Patent No.: US 6,531,188 B1
(45) Date of Patent: Mar. 11, 2003

(54) METHOD FOR MULTI-LAYERED COATING OF SUBSTRATES

(75) Inventors: Karin Maag, Inzlingen (DE); Helmut Löffler, Brühl (DE); Werner Lenhard, Wuppertal (DE)

(73) Assignee: E. I. du Pont de Nemours and Company, Wilmington, DE (US)

( * ) Notice: Subject to any disclaimer, the term of this patent is extended or adjusted under 35 U.S.C. 154(b) by 0 days.

(21) Appl. No.: 09/555,179

(22) PCT Filed: Nov. 5, 1998

(86) PCT No.: PCT/EP98/07082

§ 371 (c)(1), (2), (4) Date: Aug. 3, 2000

(87) PCT Pub. No.: WO99/26733

PCT Pub. Date: Jun. 3, 1999

(30) Foreign Application Priority Data

Nov. 20, 1997 (DE) ........................................ 197 51 478
Dec. 20, 1997 (DE) ........................................ 197 51 082

(51) Int. Cl.[7] ................................................ C08F 2/46

(52) U.S. Cl. ...................... 427/492; 427/140; 427/142; 427/258; 427/261; 427/264; 427/287; 427/385.5; 427/386; 427/388.1; 427/397.5; 427/407.1; 427/409; 427/410; 427/435; 427/443.2; 427/500; 427/504; 427/510; 427/514; 427/551; 427/552; 427/554; 427/555; 427/556; 427/557; 427/558; 427/559

(58) Field of Search ................................ 427/492, 500, 427/504, 510, 514, 551, 552, 554, 555, 556, 557, 558, 559, 140, 142, 258, 261, 264, 287, 385.5, 386, 388.1, 397.5, 407.1, 409, 410, 435, 443.2

(56) References Cited

U.S. PATENT DOCUMENTS 4,212,901 A 7/1980 van Neerbos et al. ..... 427/53.1
4,668,529 A 5/1987 Blair ......................... 427/54.1

FOREIGN PATENT DOCUMENTS

| | | | |
|---|---|---|---|
| CA | 2079498 | | 4/1993 |
| GB | 2210291 A | * | 6/1989 |
| GB | 2262055 A | * | 6/1993 |

* cited by examiner

*Primary Examiner*—Bernard Pianalto
(74) *Attorney, Agent, or Firm*—Steven C. Benjamin

(57) ABSTRACT

Process for producing a multi-layer lacquer finish, in which a surfacer coating compound is applied to a substrate optionally pre-coated with a priming layer and/or further coating layers, and a top coating comprising a color-imparting and/or special-effect-imparting base lacquer layer and a transparent clear lacquer layer, or a top coating comprising a pigmented one-layer top lacquer, is then applied, in which the surfacer coating compound which is used is one which either contains binders which are curable exclusively by free radical and/or cationic polymerization, wherein the said binders are cured by means of high-energy radiation, or is one which contains binders which are curable by free radical and/or cationic polymerization, wherein the said binders are cured by means of high-energy radiation, and additionally contains chemically cross-linking binders.

16 Claims, No Drawings

METHOD FOR MULTI-LAYERED COATING OF SUBSTRATES

The invention relates to a process for the multi-layer lacquering, in particular repair lacquering, of substrates, with a surfacer layer and a top lacquer layer, which in particular has uses in the automotive lacquering and automotive parts lacquering field.

Multi-layer automotive repair lacquer finishes generally consist of a surfacer layer applied to optionally pre-coated substrates and a top coating comprising a colour-imparting and/or special effect-imparting base lacquer layer and a transparent clear lacquer layer. However, it may also be a case of a top coating comprising a pigmented one-layer top lacquer.

Ecological considerations are behind a drive to reduce solvent emissions also from coating compounds in automotive repair lacquering. Thus, aqueous coating compounds or so-called high-solids coating compounds have already been developed for virtually all the lacquer layers. For example, two-component waterborne lacquers based on hydroxy-functional binders and polyisocyanate curing agents and on epoxy/polyamine systems are known for the surfacer and primer sector. On a number of points, however, coatings obtained with these lacquers still fail to match the properties of conventional solvent-based surfacers and primers. For example, the sandability of waterborne surfacers is still inadequate, and there are difficulties in achieving blister-free application at higher layer thicknesses. When waterborne lacquers are used a prolonged drying time must furthermore generally be accepted, thus compromising productivity, for example in a lacquering workshop.

It is already known to use coating compounds which are curable by means of high-energy radiation in automotive lacquering.

U.S. Pat. No. 4,668,529 thus describes a one-component surfacer coating compound for repair lacquering, which is curable by means of UV radiation. The only UV-curable components used are so-called reactive diluents. These are tripropylene glycol triacrylate and trimethyl propane triacrylate. A physically drying epoxy resin based on a bisphenol A-diglycidyl ether is contained additionally.

EP-A-000 407 describes radiation-curable coating compounds based on an OH-functional polyester resin esterified with acrylic acid, a vinyl compound, a photoinitiator and a polyisocyanate. In a first curing step the irradiation curing is effected by means of UV light, and in a second curing step the coating obtains its final hardness as a result of OH/NCO cross-linking. The second curing step can take place at from 130 to 200° C. or over a period of days at room temperature. The final hardness is achieved only after a number of days.

EP-A-247 563 describes UV-curable clear lacquers based on a poly(meth) acryloyl-functional compound, a polyol mono(meth)acrylate, a polyisocyanate, a light stabiliser and a photoinitiator. Here, some of the radiation-curable binders still contain hydroxy functions which are able to react with the available polyisocyanate, and afford additional curing potential.

EP-A-540 884 describes a process for producing a multi-layer lacquer finish for automotive production line lacquering by the application of a clear lacquer layer to a dried or cross-linked base lacquer layer, with the clear lacquer coating compound containing binders which are curable by free radical and/or cationic polymerisation, and with curing being carried out by means of high-energy radiation. Irradiation of the clear lacquer layer is followed by the stoving process, with the base lacquer and the clear lacquer being stoved together at, for example, from 80 to 160° C.

The object of the invention was to provide a process for producing a multi-layer lacquer finish, in particular a repair lacquer finish, which enables environmentally acceptable surfacer coating compounds also to be applied without difficulty at high layer thicknesses and high pigmentation levels. The coatings obtained should show rapid and complete full curing and be fully sandable after a short drying time, as well as affording very good inter-layer adhesion, good top lacquer build and satisfactory resistance to chemicals, petrol and water.

The object is achieved by a process for producing a multi-layer lacquer finish, in which a surfacer coating compound is applied to a substrate optionally pre-coated with a priming compound and/or further coating compounds, after which a top coating comprising a colour-imparting and/or special-effect-imparting base lacquer layer and a transparent clear lacquer layer, or a top coating comprising a pigmented one-layer top lacquer are applied, characterised in that the surfacer coating compound which is used is one which either contains binders which are curable exclusively by free radical and/or cationic polymerisation, wherein the said binders are cured by means of high-energy radiation, or is one which contains binders which are curable by free radical and/or cationic polymerisation, wherein the said binders are cured by means of high-energy radiation, and which additionally contains chemically cross-linking binders.

It was surprising and not deducible from the prior art that the multi-layer lacquer finishes obtained by the process according to the invention show the same excellent properties demanded for a lacquer finish as have hitherto been obtained with the conventional highly regarded but solvent-based lacquers, in particular repair lacquers. This applies in particular to properties such as sandability, top lacquer build, resistance to water and chemicals. It was surprisingly found, furthermore, that as regards inter-layer adhesion as well as rapid and complete full curing the multi-layer structure according to the invention is even superior to a conventional repair lacquer structure, even at high layer thicknesses and high pigmentation levels.

The surfacer coating compounds which are usable in the process according to the invention are constituted by coating compounds which cross-link by means of high-energy radiation by way of free radical and/or cationic polymerisation. They may here be high-solids aqueous or solvent-based systems, for example having a solids content of from 50 to 95 wt. % (in both aqueous and conventional, solvent-containing systems). The systems may, however, also be present as 100% coating compounds which can be applied without solvent and without water.

In the process according to the invention, any conventional radiation-curable binders or mixtures thereof, which are known to those skilled in the art and are described in the literature may be used as binders which are curable by means of high-energy radiation. These are binders which are cross-linkable either by free radical or cationic polymerisation. In the case of the former, as a result of the high-energy radiation acting on the photoinitiators radicals arise which then trigger the cross-linking reaction. In the cationic-curing systems irradiation causes Lewis acids to be formed from initiators, which in turn then trigger the cross-linking reaction.

The free radical-curing binders may be constituted, for example, by prepolymers such as polymers or oligomers having in the molecule olefinic double bonds which are polymerisable by free radical initiation. Examples of prepolymers and oligomers are (meth)acrylic-functional (meth) acrylic copolymers, epoxy resin (meth)acrylates, polyester (meth)acrylates, polyether (meth)acrylates, polyurethane (meth)acrylates, amino (meth)acrylates, silicone (meth) acrylates, melamine (meth)acrylates, unsaturated polyurethanes or unsaturated polyesters. The number average molar mass (Mn) of these compounds is preferably around 200 to 10 000. The molecule preferably contains on average 2 to 20 olefinic double bonds which are polymerisable by free radical initiation. Aliphatic and/or cycloaliphatic (meth) acrylates in each case are preferably used. (Cyclo)aliphatic polyurethane (meth)acrylates, polyester (meth)acrylates and epoxy (meth)acrylates are particularly preferred. The binders may be used singly or in mixture.

The prepolymers may be present in combination with reactive diluents, that is to say reactive polymerisable liquid monomers. The reactive diluents are generally used in quantities of from 1 to 50 wt. %, preferably 5 to 30 wt. %, with reference to the total weight of prepolymer and reactive diluent. The reactive diluents may be monounsaturated, diunsaturated or polyunsaturated. Examples of monounsaturated reactive diluents are: (meth)acrylic acid and esters thereof, maleic acid and semiesters thereof, vinyl acetate, vinyl ethers, substituted vinyl ureas, styrene, vinyl toluene. Examples of diunsaturated reactive diluents are: di(meth) acrylates such as alkylene glycol di(meth)acrylate, polyethylene glycol di(meth)acrylate, 1,3-butanediol di(meth) acrylate, vinyl (meth)acrylate, allyl (meth)acrylate, divinyl benzene, dipropylene glycol di(meth)acrylate, hexanediol di(meth)acrylate. Examples of polyunsaturated reactive diluents are: glycerol tri(meth)acrylate, trimethylolpropane tri(meth)acrylate, pentaerythritol tri(meth)acrylate, pentaerythritol tetra(meth)acrylate. The reactive thinners may be used singly or in mixture. Diacrylates such as, for example, dipropylene glycol diacrylate, tripropylene glycol diacrylate and/or hexanediol diacrylate are preferably used as reactive diluents.

The conventional binders known to those skilled in the art and described in the literature may be used as binders for cationically polymerisable systems. In this case, for example, they may be polyfunctional epoxy oligomers containing more than two epoxy groups in the molecule. These are, for example. polyalkylene glycol diglycidyl ethers, hydrogenated bisphenol A-glycidyl ethers, epoxy urethane resins, glycerol triglycidyl ethers, diglycidylhexahydrophthalate, diglycidyl esters of dimeric acids, epoxidised derivatives of (methyl)cyclohexene such as, for example, 3,4-epoxycyclohexylmethyl(3,4-epoxycyclohexane) carboxylate or epoxidised polybutadiene. The number average molar mass of the polyepoxide compounds is preferably less than 10 000. Reactive diluents such as, for example, cyclohexene oxide, butene oxide, butanediol diglycidyl ether or hexanediol diglycidyl ether, may also be used.

The binder systems which cure when acted upon by radiation contain photoinitiators. Suitable photoinitiators are, for example, those which absorb within the wavelength range of 190 to 600 nm.

Examples of photoinitiators for free radical-curing systems are benzoin and benzoin derivatives, acetophenone, and acetophenone derivatives such as, for example, 2,2-diacetoxyacetophenone, benzophenone and benzophenone derivatives. thioxanthone and thioxanthone derivatives, anthraquinone, 1-benzoylcyclohexanol, organophosphorus compounds such as, for example, acyl phosphine oxides. The photoinitiators are used in quantities of, for example, from 0. 1 to 7 wt. %, preferably 0. 5 to 5 wt. %, with reference to the sum of prepolymers polymerisable by free radical initiation, reactive diluents and photoinitiators. The photoinitiators may be used singly or in combination. Further synergistic components, for example tertiary amines, may furthermore be used.

Photoinitiators for cationically-curing systems are substances which are known as onium salts, which release Lewis acids by photolysis when acted upon by radiation. Examples of these are diazonium salts, sulfonium salts or iodonium salts. Triarylsulfonium salts are preferred. The photoinitiators for cationically-curing systems may be used singly or as mixtures, in quantities of from 0. 5 to 5 wt. %, with reference to the sum of cationically polymerisable prepolymers, reactive diluents and initiators.

Various free radical-curing systems, various cationically-curing systems or free radical and cationically-curing systems may be combined with one another to prepare the surfacer coating compounds which are curable by means of high-energy radiation, for example pulsed radiation. Free radical-curing systems are preferably used. Preferred free radical-curing binders are epoxy (meth)acrylates, polyurethane (meth)acrylates, polyester (meth)acrylates and (meth) acrylic-finctional poly (meth)acrylates. Aromatic epoxy (meth)acrylates are particularly preferred. The binders named by way of example which are curable by means of high-energy radiation are generally obtainable as commercial products.

According to the invention the surfacer coating compounds which are curable by means of high-energy radiation may contain binders which are curable exclusively by means of high-energy radiation. However, they may also contain in addition to the binders which are curable by means of high-energy radiation other chemically cross-linking binders. Any two-component binder system based on a hydroxy-functional and an isocyanate-functional component, a hydroxy-functional and an anhydride component, a polyamine component and an epoxy component or a polyamine component and an acryloyl-functional component may, for example, be used as chemically cross-linking binders. The additionally usable binders may be solvent-based or aqueous. If in addition to the radiation-curable binders other chemically cross-linking binders are also used in the surfacer coating compounds, then those such as are based on a hydroxy-functional and an isocyanate-functional component or a polyamine component and an epoxy component may preferably be used. The proportion of chemically cross-linking binders may be, for example, up to 50 wt. %, with reference to the UV-curable binder.

The surfacer coating compounds which are usable in the process according to the invention may contain extenders and pigments. These are the conventional extenders which are usable in the lacquer industry and organic or inorganic colour-imparting and/or anti-corrosion pigments. Examples of pigments are titanium dioxide, micronised titanium dioxide, iron oxide pigments, carbon black, azo pigments, zinc phosphate. Examples of extenders are silicon dioxide, aluminium silicate, barium sulphate and talcum. In order to improve hardness and sandability UV-curable pigments and/ or extenders may advantageously also be used. These are pigments and/or extenders which are coated with UV radiation-curable compounds, for example with acrylic-functional silanes, and are included in the radiation curing process.

The surfacer coating compounds which are usable in the process according to the invention may contain additives which are conventional in lacquers. The additives are conventional additives which are usable in the lacquer sector. Examples of such additives are leveling agents, for example based on (meth)acrylic homopolymers or silicone oils, anticratering agents, antifoams, catalysts, adhesion promoters. The additives are used in conventional quantities well-known to those skilled in the art.

The surfacers which are usable in the process according to the invention may be of solvent-free formulation. Their solids content is then 100 wt. %. The surfacers may, however, also contain small quantities of organic solvents and/or water. The solvents are conventional solvents used in lacquer technology. These may originate in the preparation of the binders, or are added separately. Examples of such solvents are monohydric or polyhydric alcohols, for example propanol, butanol, hexanol; glycol ethers or glycol esters, for example butyl glycol, butyl diglycol, diethylene glycol dialkyl ether, dipropylene glycol dialkyl ether, ethyl glycol acetate, butyl glycol acetate, butyl diglycol acetate, esters such as, for example, butyl acetate, isobutyl acetate, amyl acetate, glycols, for example ethylene glycol, propylene glycol and oligomers thereof, alkyl pyrrolidones, for example N-methylpyrrolidone as well as ketones, for example methyl ethyl ketone, acetone, cyclohexanone; aromatic or aliphatic hydrocarbons, for example toluene, xylene or linear or branched-chain aliphatic $C_6$–$C_{12}$ hydrocarbons.

The surfacer layer is applied in the process according to the invention to an optionally pre-coated substrate. Preferred substrates are substrates of metal or plastics material. The surfacers may be applied to conventional priming layers or further intermediate layers such as are employed for multi-layer lacquering in the automotive sector. They may be applied to an automotive body or parts thereof already pre-coated or pre-treated as part of automotive repair lacquering, however they may also be applied to old lacquer finishes. They are applied by the known processes, preferably by spray application.

The surfacers may, for example, be applied to conventional solvent-based or water-based fillers, primers, adhesion primers or further intermediate layers such as are conventional for automotive repair lacquering, or to old lacquer finishes such as, for example electrophoretic bases. The bases or lacquer layers to which the surfacer layer is applied may in this case be already hardened or pre-dried. Fillers, primers or priming compositions based on peroxide-curing unsaturated polyesters, acid-curing polyvinyl butyrals, physically drying binders, for example polyurethanes or acrylates, as well as two-component cross-linking binders, for example based on an epoxy component and a polyamine component or a polyisocyanate component and a hydroxy component are, for example, considered as fillers, primers or priming compositions which are conventional for repair lacquering.

After the application of the surfacer to one of the aforementioned bases the surfacer layer, optionally after a short flash-off phase, is exposed to high-energy radiation, preferably UV radiation. UV radiation sources which emit in the wavelength range 180 to 420 nm, in particular 200 to 400 nm, are preferred. Examples of such UV radiation sources are optionally doped high-pressure, medium-pressure and low-pressure mercury vapour radiators, gas discharge tubes such as, for example, low-pressure xenon lamps, pulsed and unpulsed TV lasers, UV spot radiators such as, for example, UV-emitting diodes and black light tubes. Irradiation is preferably with pulsed UV radiation. So-called high-energy electron flash devices (abbreviated to TV flash lamps) are then particularly preferably used as the radiation source.

Preferred UV flash lamps emit light of a wavelength of from 200 to 900 nm with a maximum at approximately 300 to 500 nm. The UV flash lamps preferably contain a plurality of flash tubes, for example quartz tubes filled with an inert gas such as xenon. The UV flash lamps should deliver at the surface of the coating to be cured an illuminance of at least 10 megalux, preferably 10 to 80 megalux, per flash discharge. The energy per flash discharge should preferably be from 1 to 10 kJoule. The UV flash lamps are preferably transportable devices able to be positioned directly facing a damaged area for repair. Depending on the circumstances, one or more UV flash lamps may be used. UV flash lamps which are usable are described in WO-A-9411123 and EP-A-525 340, for example. UV flash lamps are commercially obtainable.

The surfacer layer may then be dried and cured by a plurality of successive flash discharges. From 1 to 40 successive flash discharges are preferably released. Here, the distance of the UV flash lamp from the substrate surface to be irradiated may be from 5 to 50 cm, preferably 10 to 25 cm, particularly preferably 15 to 20 cm. The UW lamps may here be screened to prevent radiation leakage by, for example, employing an appropriately lined protective housing around the transportable lamp unit or with the aid of other safety measures known to those skilled in the art.

The total duration of irradiation is in the region of a few seconds, for example within the range 3 milliseconds to 400 seconds, preferably 4 to 160 seconds, depending on the number of flash discharges selected. The flashes may be released approximately every 4 seconds, for example. The UV flash lamps are always ready for use immediately, that is to say they require no warm-up time and can remain switched off between two curing or irradiation operations separated by a time interval, without time being lost on the resumed irradiation operation on account of the warm-up phase.

A particular advantage of the process according to the invention lies in the possibility of applying high layer thicknesses in one working operation (without intermediate sanding) and, even when the surfacer has a very high pigmentation level, for example at a pigment volume concentration (p.v.c) of from 30 to 45% or more, of applying coatings having layer thicknesses of, for example, from 200 to 400, preferably 300 to 400 $\mu$m, with rapid full curing, which are fully sandable. A possible procedure for affording rapid full curing, even at high pigmentation levels, is to apply the surfacer coating compound in a plurality of spray passes, preferably two, and effect in each case an intermediate irradiation after the first spray pass or after each further spray pass, if a total of more than two spray passes are effected. Thus, for example, a layer of from 100 to 200 $\mu$m is applied in a first spray pass, an intermediate cure is effected with, for example, from 2 to 5 flashes, a further layer of, for example, from 100 to 200 $\mu$m is then applied in a second spray pass, and the complete curing is effected with the necessary number of flash discharges.

If in addition to the radiation-curable binders further chemically cross-linkable binders are also contained in the surfacer coating compounds which are usable according to the invention, the temperatures generated on the coating by means of the UV irradiation (UV flash lamp) are generally sufficient to cure the additional cross-linkable binders. No separate curing operation is necessary.

The surfacer coating compounds which are usable in the process according to the invention may be formulated or used as sanding surfacers, primer surfacers or wet-on-wet surfacers.

A top coating comprising a colour-imparting and/or special-effect-imparting base lacquer layer and a transparent clear lacquer layer, or a top coating comprising a pigmented one-layer top lacquer, is applied after partial or complete curing of the surfacer layer or wet-on-wet to the surfacer layer in the process according to the invention.

All those solvent-based or water-based base lacquers which are conventional in automotive lacquering,in particular repair lacquering,and are known to those skilled in the art are suitable as colour-imparting and/or special-effect-imparting base lacquers which are usable for the base lacquer/clear lacquer top coating. Examples of solvent-based base lacquers are those based on polyacrylate resins and/or polyester resins, optionally in combination with melarnine resins and cellulose esters. Examples of water-based lacquers are those based on physically drying polyurethane resins, polyurethane/urea resins, polyester resins, polyester urethane resins and/or polyacrylic resins as well as modifications thereof such as, for example, acrylised or silicon-modified polyurethane resins and/or polyester resins. Water-based lacquers prepared from chemically cross-linking binder components, for example prepared from hydroxyl group-containing binders and polyisocyanate cross-linking agents are, furthermore, considered.

The base lacquer layer may be cured at room temperature or in forced manner at, for example, from 40 to 80° C. The base lacquer layer may, however, also be cured wet-on-wet, overlacquered optionally after a short flash-off phase with a clear lacquer, and then cured together with the clear lacquer.

One embodiment of the process according to the invention comprises using as the base lacquer one which contains binders which are curable by means of high-energy radiation. The binders which are curable by means of high-energy radiation are, for example, those binders already mentioned hereinabove in the description of the surfacer coating compounds. In this case, however, aliphatic polyurethane (meth) acrylates and/or aliphatic (meth)acrylic-functional poly (meth)acrylates are preferably used in the base lacquer.

Curing can then be effected by a UV radiation source, as described hereinabove for the surfacer. Here, the base lacquer may be applied wet-on-wet to the surfacer layer (wet-on-wet surfacer), and the surfacer layer and the base lacquer layer are exposed to the radiation together in one working step. A brief intermediate irradiation of the surfacer layer may optionally be effected. However, in particular when the surfacer layer thicknesses and pigmentation levels are high, the surfacer layer may also first be hardened completely by means of UV radiation (sanding surfacer), optionally in a plurality of irradiation steps, and the separate curing of the base lacquer layer may then be effected by UV radiation.

All those solvent-based or water-based clear lacquers which are conventional in automotive lacquering,in particular repair lacquering,and are known to those skilled in the art are suitable as clear lacquers which are usable for the base lacquer/clear lacquer top coating. Examples are solvent-based or aqueous clear lacquers based on hydroxyl group-containing and/or amino group-containing binders and polyisocyanate cross-linking agents as well as based on amino group-containing and acryloyl group-containing binders. The clear lacquer layer may be cured at room temperature or in forced manner at, for example, from 40 to 80° C.

A further embodiment of the process according to the invention comprises producing a multi-layer structure based on a radiation-curable surfacer, a physically drying or chemically cross-linking base lacquer not based on radiation-curable binders, and a clear lacquer which contains binders which are curable by means of high-energy radiation. In this case the base lacquer may be applied to the completely hardened surfacer, and the radiation-curing clear lacquer may be applied after curing of the base lacquer or after a brief intermediate drying of the base lacquer. Irradiation by UV rays follows. The clear lacquer may in this case contain the conventional radiation-curable binders, as already named hereinabove in the description of the surfacer coating compounds. Here, aliphatic polyurethane (meth) acrylates and/or aliphatic acrylic-fumctional poly(meth) acrylates are preferably used.

In this embodiment binders which are curable by means of high-energy radiation and are based on aromatic epoxy (meth)acrylates are particularly preferably used in the surfacer, and in the clear lacquer binders which are curable by means of high-energy radiation and are based on aliphatic polyurethane (meth)acrylates and/or aliphatic (meth) acrylic-functional poly(meth)acrylates.

It is furthermore also possible to apply a conventional solvent-based or water-based pigmented one-layer top lacquer to the surfacer layer after curing or intermediate curing of the latter, or wet-on-wet. In a short time multi-layer coatings of great hardness, with high scratch resistance and very good resistance to chemicals and water are obtained by the process according to the invention. The individual lacquer layers show very good inter-layer adhesion, and resistance to partial dissolution vis-a-vis underlying and overlying lacquer layers. Even very thick surfacer layers can be applied without blistering in one spray pass, with rapid drying. Even highly pigmented surfacers can be applied to high layer thicknesses, with rapid and complete full curing. The surfacer coatings are fully sandable after a short drying time. They demonstrate very good top lacquer build.

In other respects the coatings meet the requirements of a lacquer structure, for example a repair lacquer structure, in the automotive lacquering field, with drying and curing of the coatings being possible within a far shorter time than is the case with lacquer structures dried and cured in conventional manner.

The process according to the invention may be used advantageously in automotive repair lacquering,in particular for repair lacquering of automotive parts, smallish damaged areas and spot repairs.

The invention is explained by reference to the following Example.

EXAMPLE

Preparation of a Surfacer

The following components were mixed together and dispersed for a few minutes in a high-speed stirrer (all quantities indicated are by weight):

131 parts commercial aromatic epoxy acrylate
56 parts hexanediol diacrylate
9 parts commercial adhesion promoter
127 parts commercial barytes
126 parts commercial kaolin
6.1 parts of a mixture of commercial photoinitiators (derivative of arylphosphine oxide and of acetophenone)
113 parts butyl acetate

Producing a Multi-Layer Structure

The surfacer prepared hereinabove is applied to electrophoretically coated metal sheets. A surfacer layer is applied to a resulting dry film layer thickness of approx. 300 μm in one working operation, and after a short flash-off time at room temperature the surfacer layer is exposed to irradiation from a UV flash lamp (3500 Ws). It is irradiated with 30 flashes (approx. 120 s). The surfacer is then sanded, and a solvent-based conventional pigmented two-component top lacquer based on acrylate/polyisocyanate is over-lacquered.

Result of Testing the Lacquer Finish

| Property | Multi-layer structure according to the invention | Comparison multi-layer structure (1) |
|---|---|---|
| Damp/warm test (2) (3) | 0/0 | |
| Adhesion (4) | 0–1 | |
| Adhesion (4) after damp/warm test (2) | 0–1 | |
| Sandability of surfacer | O.K. | O.K. |
| Top lacquer build | O.K. | O.K. |

(1) For comparison purposes the UV surfacer in the repair lacquer structure described above was replaced by a conventional solvent-based two-component polyurethane surfacer.
(2) Damp/warm test in accordance with DIN 50017
(3) Evaluation of blistering in accordance with DIN 53209
(4) Cross-hatch adhesion test based on DIN 53151

The results show that as regards sandability and top lacquer build the multi-layer structure according to the invention matches the excellent properties of a conventional repair lacquer structure having a solvent-based two-component surfacer. At comparable high surfacer layer thicknesses of, for example, 300 $\mu$m, and without intermediate sanding, as regards adhesion to various bases the multi-layer structure according to the invention is even markedly superior to a conventional repair lacquer structure having a solvent-based two-component surfacer.

What is claimed is:

1. A process for forming a multi-layer finish having an automotive quality appearance on a substrate selected from the group consisting of automotive bodies and automotive parts comprising the steps of:

1) applying a surfacer coating layer to the substrate wherein the surfacer coating comprises a binder selected from the group consisting of a binder curable exclusively by free radical polymerization, a binder curable exclusively by cationic polymerization, a mixture of binders one curable by free radical polymerization and a second curable by cationic polymerization, a binder curable exclusively by free radical polymerization and a chemically crosslinking binder, a binder curable exclusively by cationic polymerization and a chemically crosslinking binder;

2) curing the surfacer coating layer with UV energy radiation;

3) applying a base lacquer coating layer over the surfacer coating wherein the base layer coating layer comprises a color—imparting layer and a binder selected from the group consisting of a binder curable exclusively by free radical polymerization, a binder curable exclusively by cationic polymerization and a mixture of binders one curable by free radical polymerization and a second curable by cationic polymerization;

4) curing the base lacquer coating layer with UV energy radiation;

5) applying a clear lacquer coating layer over the base lacquer layer; and 6) curing the clear coating layer to form finish having an automotive quality appearance.

2. The process of claim 1 wherein pulsed UV radiation is used to cure the surfacer layer and the base lacquer layer.

3. The process of claim 1 wherein the base lacquer coating is selected from the group consisting of aliphatic polyurethane (meth)acrylates and aliphatic (meth)acrylic-functional (meth)acrylate copolymers, each being curable by free radical polymerization.

4. The process of claim 1 wherein the binder of the surfacer coating comprises aromatic epoxy resin (meth) acrylates curable by free radical polymerization.

5. The process of claim 1 in which the clear lacquer coating is a UV radiation curable lacquer coating and cured by UV radiation.

6. The process of claim 5 in which the clear lacquer coating is selected from the group consisting of aliphatic polyurethane (meth)acrylates and aliphatic (meth)acrylic-functional (meth)acrylate copolymers, each being curable by free radical polymerization.

7. The process of claim 5 in which the base lacquer coating layer and the clear lacquer coating layer are cured simultaneously by UV radiation.

8. The process of claim 1 used in the repair of multi-layer lacquer coated automotive bodies or parts thereof.

9. A process for forming a multi-layer finish having an automotive quality appearance on a substrate selected from the group consisting of automotive bodies and automotive parts comprising the steps of:

1) applying a surfacer coating layer to the substrate wherein the surfacer coating comprises compounds selected from the group consisting of extenders, pigments and mixtures thereof and a binder selected from the group consisting of a binder curable exclusively by free radical polymerization, a binder curable exclusively by cationic polymerization, a mixture of binders one curable by free radical polymerization and a second curable by cationic polymerization, a binder curable exclusively by free radical polymerization and a chemically crosslinking binder, a binder curable exclusively by cationic polymerization and a chemically crosslinking binder;

2) curing the surfacer coating layer with UV energy radiation;

3) applying a base lacquer coating layer over the surfacer coating wherein the base lacquer coating layer comprises a color-imparting layer and comprises a binder selected from the group consisting of a chemical crosslinking binder and a physically drying binder and a mixture thereof;

4) applying a clear lacquer coating layer over the base lacquer layer comprising a film forming binder; and 5) curing the base coating and clear coating layers to form a finish having an automotive quality appearance.

10. The process of claim 9 wherein pulsed UV radiation is used to cure the surfacer layer.

11. The process of claim 9 wherein the binder of the surfacer coating comprises aromatic epoxy resin (meth) acrylates curable by free radical polymerization.

12. The process of claim 9 in which the clear lacquer coating is a UV radiation curable lacquer coating and cured by UV radiation.

13. The process of claim 9 in which the clear lacquer coating is selected from the group consisting of aliphatic polyurethane (meth)acrylate and aliphatic (meth)acrylic-functional (meth)acrylate copolymers each being curable by free radical polymerization.

14. The process of claim 9 in which the surfacer coating layer is applied to a layer thickness of up to 400 $\mu$m.

15. The process of claim 9 in which the substrate is coated with a primer layer before application of the surfacer coating layer.

16. The process of claim 9 used in the repair of multi-layer lacquer coated automotive bodies or parts thereof.

* * * * *